Figure 1:
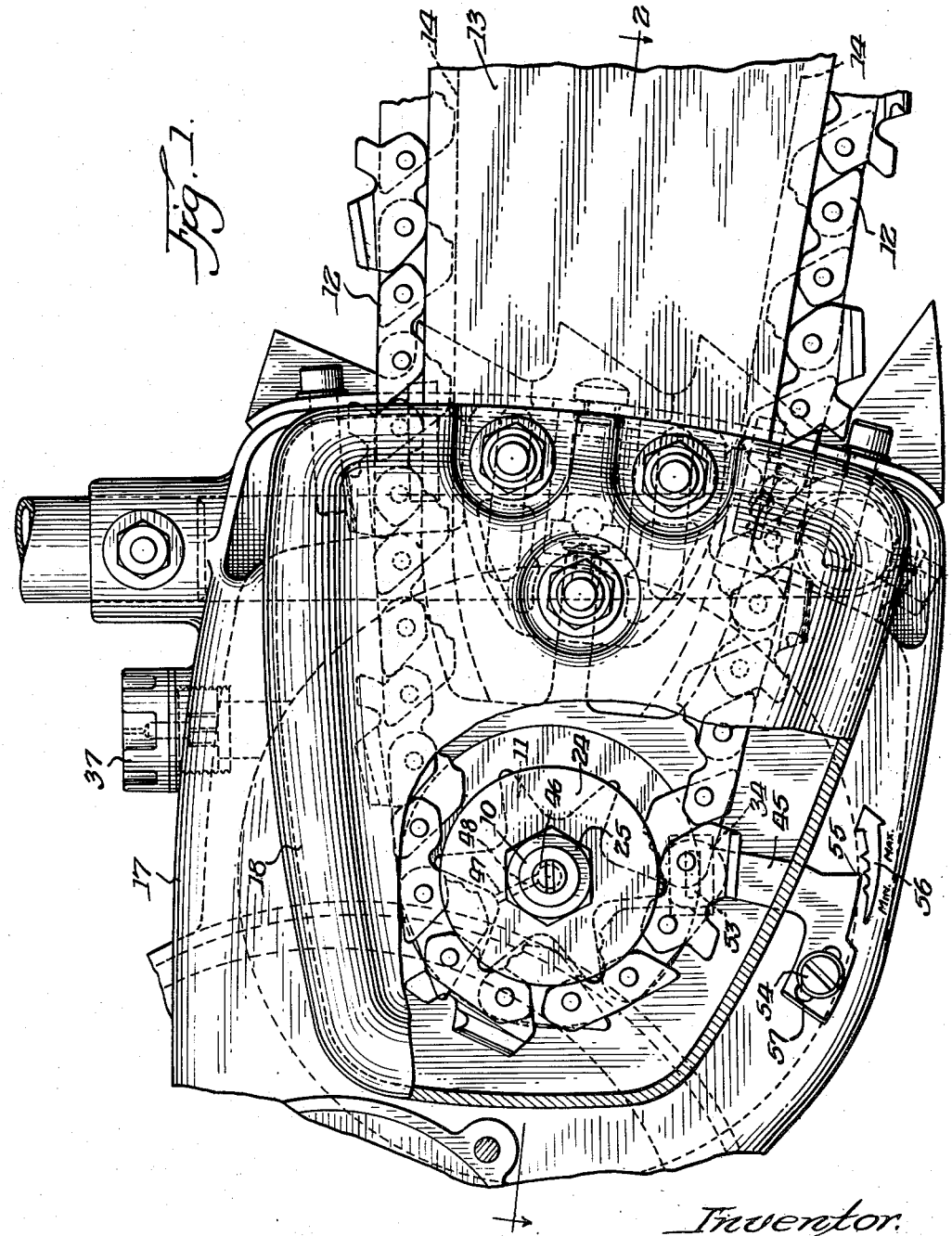

Oct. 15, 1957 — M. O. KOS — 2,809,718
SAW CHAIN OIL PUMP
Filed May 27, 1954 — 3 Sheets-Sheet 2

Inventor:
Michael O. Kos.
By John Bundock, Atty.

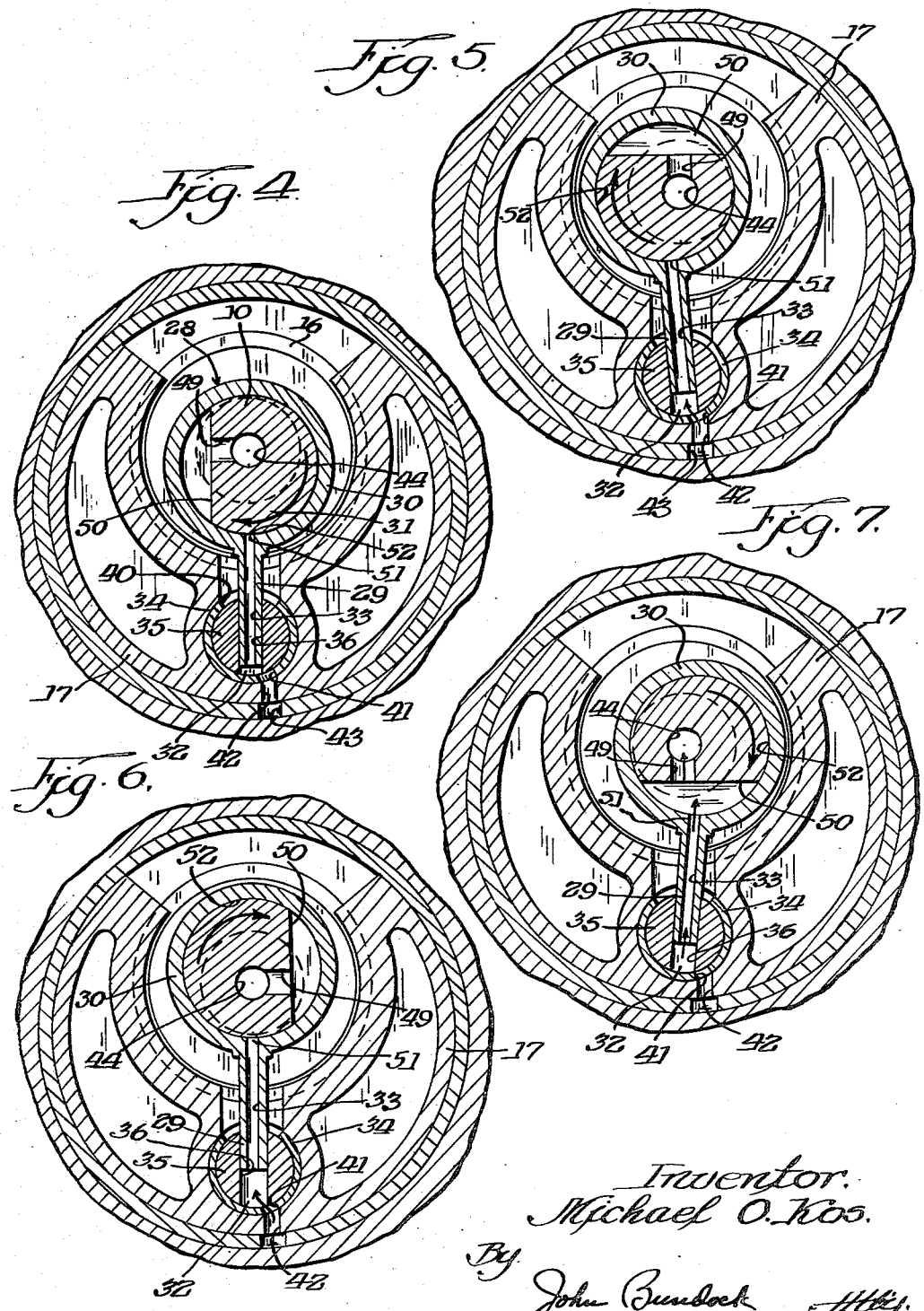

2,809,718
Patented Oct. 15, 1957

2,809,718
SAW CHAIN OIL PUMP

Michael O. Kos, Guelph, Ontario, Canada, assignor to Mall Tool Company, Chicago, Ill., a corporation of Illinois Application May 27, 1954, Serial No. 432,803

3 Claims. (Cl. 184—27)

This invention relates to an oil pump and in a preferred form is employed in an automatic oiler for a power chain saw.

The present day chain saw is widely used for power felling, bucking and limbing of timber. It comprises a cutting chain carried on a guide bar and capable of being driven at high speed. Power is furnished through a transmission from either a gasoline, electric, or pneumatic motor.

It is desirable to lubricate the groove of the guide bar, wherein the cutting chain travels, to reduce friction and permit the chain to ride easily around the bar. This may be done manually or automatically as by an automatic oiler built into the machine. With manually operated systems it has been common practice to apply oil to the side of the chain in its travel separate from the guide bar at the sprocket end. An alternative method has been to apply the oil directly in the groove of the guide bar as by passages communicating with openings in the bottom of the groove.

A hand pump sometimes is provided which is used by the operator to force lubricant from a reservoir to the cutting chain. Another method uses a wick to draw the oil from a reservoir and apply it to the chain.

The conventional automatic oiler is a system which includes a reservoir for oil, a pump, and means for conducting the oil forced through the system by the pump to the parts requiring lubrication. Normally the pump is operated with each cycle of high speed saw action as compared with the manually operated pump in the non-automatic system.

Applicant in a preferred form of his invention lubricates the cutting chain of a power saw from a hole in the driving sprocket, which involves hollowing out the sprocket shaft and forcing oil from a reservoir through the shaft to a radial passage in the sprocket. Many advantages are gained by using this method of applying lubricant to the cutting chain. The entire system may be self contained and housed within or adjacent to the sprocket shaft.

With this arrangement, however, it is required that oil be pumped from the reservoir into the sprocket shaft, which presents certain problems since the sprocket shaft rotates during cutting operation of the saw.

It is a principal object of applicant's invention to provide a pump and system for conducting lubricant from a reservoir into the sprocket shaft.

Since the oil pump in an automatic system is operated with each cycle of high-speed saw action, the pump must have a small capacity otherwise too large a quantity of oil is pumped through the system. Oil applied to the chain in larger quantities than required for proper lubrication is wasted and may lessen the cutting efficiency of the chain.

Another object of applicant's invention is to provide a pump and system for conducting lubricant from a reservoir into the sprocket shaft which includes an adjustment means so that the quantity of fluid pumped each cycle may be regulated between close limits.

Various general requirements exist for automatic oiler systems and the components making up such systems. For example, it is necessary that the pump in the system be self-priming. The mechanism and parts constituting the system should be compactly arranged so that it may be housed in the transmission of the saw. The number of rotating parts should be kept small to minimize the problem of oil sealing and the unit must be rugged and dependable in operation otherwise the advantage of having an automatic system is lost in the disadvantage of having increased the weight of the saw.

Accordingly, a further object of applicant's invention is to provide a pump utilizing a positive suction stroke so as to provide self-priming.

A still further object of applicant's invention is to provide a fluid pump having a comparatively large displacement and wherein a portion of the charge drawn into the pump cylinder upon the suction stroke is expelled out the inlet port of the cylinder during the discharge stroke, the inlet port being open during a portion of the discharge stroke, so that the fluid expelled out the discharge port constitutes only a minor portion of the entire displacement capacity of the cylinder.

Another object of this invention is to provide a fluid pump having an adjustment means whereby the period during the discharge stroke that the inlet port remains open is variable, whereby the quantity of fluid pumped each cycle may be regulated between close limits.

Another object of this invention is to provide a fluid pump for use in a chain saw oiler comprising relative reciprocable piston and cylinder members telescopically arranged, the outer cylinder member being supported for oscillation about an axis transverse to its own axis and being provided with a cover over the open end, the cover being adjustable whereby the quantity of fluid pumped during each cycle may be regulated.

Still another object of this invention is to provide in a chain saw oiler a piston cylinder pump assembly formed of telescopically arranged members, the outer cylinder member being rotatable in the saw housing, with means to adjust the quantity of fluid entering the cylinder from the supply line, and the sprocket shaft mounted in the saw housing operating a crank connected to the piston.

A further object of this invention is to provide a fluid pump having an adjustment means whereby the quantity of fluid pumped each cycle may be regulated between close limits and which is sturdily constructed and has all moving parts compactly arranged.

Figure 2:
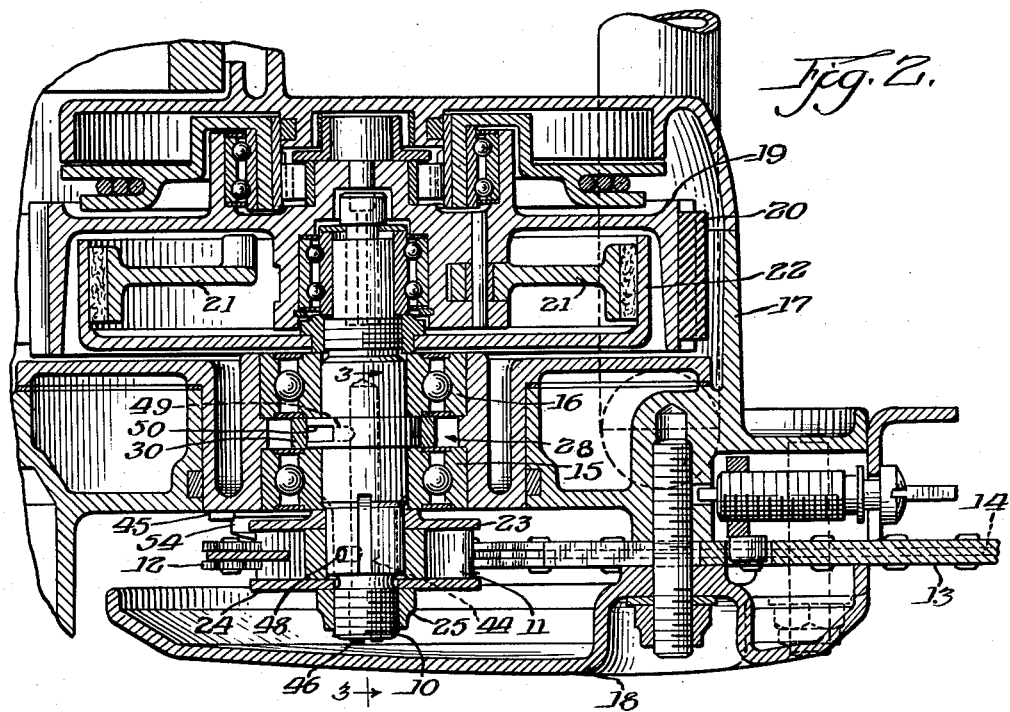
Figure 3:
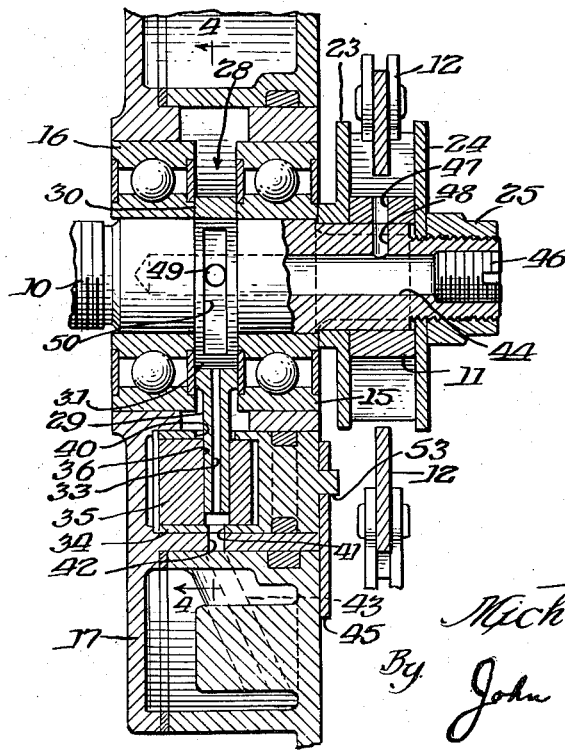

The foregoing and other objects will be apparent from the following description when read in conjunction with the accompanying drawings, in which, Fig. 1 is a side elevation view of the transmission housing of a chain saw Fig. 2 is a section view taken on line 2—2 of Fig. 1, showing the construction of the transmission contained within the housing Fig. 3 is an enlarged section view taken on line 3—3 of Fig. 2 showing the lubricating mechanism of the present invention Fig. 4 is an enlarged section view taken on the line 4—4 of Fig. 3, showing particularly the arrangement of parts comprising the oil pump of this invention Fig. 5 is a section view similar to that shown in Fig. 4 but with the mechanism one-quarter cycle advanced from the piston shown in Fig. 4, during the oil suction stroke Fig. 6 is a section view similar to that shown in Fig. 4 but with the mechanism one-half cycle advanced from the position shown in Fig. 4

Fig. 7 is a section view similar to that shown in Fig. 4 but with the mechanism advanced three-quarters cycle from the position shown in Fig. 4, during the oil delivery stroke.

In Fig. 1 there is illustrated a portion of a chain saw of a conventional type with a sprocket shaft 10 rotatably mounted in the transmission of the saw. A sprocket 11 is secured onto a projecting end of shaft 10 to drive a saw chain 12. The forward end of the saw contains a chain guide bar 13 which is grooved about its periphery as at 14 for guiding the chain 12 in its travel.

Referring to Fig. 2, the invention is shown in a chain saw transmission wherein the sprocket shaft 10 is rotatably mounted by means of bearings 15 and 16 in a transmission housing 17. A cover plate 18 is bolted to transmission housing 17. Also shown supported by the transmission housing 17 is a clutch drive consisting of a pulley member 19 which is operated by a drive belt 20 driven from a conventional power source (not shown). Through the clutch shoes 21, pulley 19 drives drum member 22 which is secured to shaft 10.

The opposite end of shaft 10 is preferably splined to receive sprocket 11 which is maintained in an axial position on the shaft by means of inner spacer member 23 and outer washer 24, while nut 25 secures the sprocket assembly. Guide bar 13 and cutting saw chain 12 extend forwardly from transmission housing 17. The pump of this invention is intended to lubricate the chain as it travels in the groove 14 of guide bar 13.

The foregoing description is substantially that of a conventional chain saw such as is disclosed in U. S. patent application Serial Number 337,288, filed February 17, 1953, now abandoned.

Referring now to Figs. 3 and 4, mounted intermediate bearing members 15 and 16 is a preferred form of pump mechanism constructed in accordance with applicant's invention, comprising a piston and cylinder assembly designated generally 28. Said assembly includes a plunger 29 provided with a top ring portion 30 encircling an eccentric 31 provided on shaft 10 and working in a cylinder 32. Plunger 29 is also provided with an axial bore or passage 33 constituting a discharge passage in communication with the cylinder cavity 32 and opening to the interior of ring 30 as best shown in Fig. 4.

Transmission housing 17 is provided with a section which supports and houses bushing 34 wherein there is journalled a rod 35 which has a tranvserse opening forming a bore 36 extending therethrough. These members are fitted together so as to be fluid tight except for bore 36 which forms a flow passage and openings 40, 41 on opposite sides of bushing 34. Plunger 29 projects through opening 40, a slot, while opening 41 constitutes an inlet port into the cylinder cavity 32 which is formed by bore 36 and the inner surface of bushing 34. It will be observed that bushing 34 functions as a cover capping the open end of the bore and, further, that the plunger 29 fits snugly in the cylinder so as to seal against leakage of fluid.

Opening 42 provided in the housing section 17 as shown as aligned with opening 41 in bushing 34 in the position of the mechanism illustrated in Fig. 4, and the inlet passage so formed is in communication with the cylinder cavity 32. Also provided within transmission housing 17 is an oil supply line 43 in communication with the inlet passage formed by openings 41, 42. It should be understood that this line 43 extends to the oil tank either by means of being a part of the tank or through a flexible conduit line (not shown). Oil is poured into the reservoir through inlet 37 shown in Fig. 1.

Sprocket shaft 10 (Fig. 3) is provided with an axial bore 44 extending from the sprocket end of the shaft to preferably at least the center line of the piston and cylinder assembly 28. The outer end of bore 44 is closed by plug 46 carried in the end of shaft 10. Sprocket 11 contains passage 47 extending from a point on the peripheral edge, preferably between sprocket teeth, radially inwardly and is aligned with shaft opening 48 as shown in Figs. 1 and 3. Shaft 10 is provided also with an opening 49 extending from the bore 44 radially outwardly to communicate with a slot 50 cut in the eccentric section 31.

Thus in the preferred form of the invention illustrated it will be noted that a continuous oil flow passage exists from the cylinder cavity 32 to the exterior of the chain sprocket 11 when the parts are at the particular point in the cycle of operation illustrated in Fig. 7. In observing Fig. 7 it should also be noted that in the position of the pump mechanism shown the inlet passage formed by openings 41, 42 is closed. It will be understood that member 35 may be oscillated to cause the inlet passage to be opened and closed. For example, the inlet passage formed by openings 41, 42 is closed upon rotation of member 35 clockwise from the position shown in Fig. 6 where the inlet passage is open, to the position shown in Fig. 7 where the inlet passage is closed.

It may be observed that the inlet passage to the cylinder cavity is open during at least a portion of the period during a single cycle of shaft rotation when eccentric 31 is on the left hand side of the center line, while the inlet passage is closed during at least a portion of the period when the eccentric 31 is on the right hand side of the center line. This is produced through the action of plunger 29 in causing member 35 to oscillate as plunger 29 reciprocates in bore 36 in response to shaft rotation. Thus, during operation of the pump mechanism the mouth or open end of bore 36 oscillates in a curved path defined by the inner wall of bushing 34, the oscillation being produced by the rotation of eccentric 31 which operates as a crank within ring 30 through the lateral oscillatory movement of the plunger 29 which accompanies longitudinal reciprocation in the cylinder.

It will also be observed that the mouth of the discharge passage 33 at the interior of ring 30 is opened and closed cyclically by eccentric 31. Slot 50 cut in eccentric 31 forms a space which is rotated into and out of communication with discharge passage 33 as shaft 10 rotates. This space is in communication with axial bore 44 through the passage 49. It is noted that in the preferred construction shown, this space remains in communication with the discharge passage for substantially less than the full 180° of shaft rotation occurring during the delivery stroke. For convenience it may be stated that the discharge passage is opened and closed alternately with respect to the opening and closing of the inlet passage, although it will be understood that it is not necessary for the discharge passage to be open during the entire delivery stroke.

The operation of the automatic lubricating system and the pump mechanism illustrated as a preferred form of this invention will now be described. Referring to Figs. 1 and 2, saw chain 12 is driven during cutting operation of the saw from a power source not shown through pulley 19 and shaft 10. During each 360° of sprocket rotation a predetemined amount of oil is ejected from opening 51 and applied to the root portion of a central link of the saw chain, the oil adhering thereto as the saw chain continues in its travel about the sprocket and guide bar. The chain automatically receives during cutting operation of the saw oil applied directly to the parts requiring lubrication with an absolute minimum of wasted oil since the oil is received upon the root portion of the central links to lubricate between the roots and the adjacent side walls of the groove of the guide bar.

As best illustrated in Fig. 3 oil is sucked from a reservoir (not shown) through supply line 43 to the inlet passage formed by openings 41 and 42 and from thence into the pump. The oil is then forced by the action of the pump through bore 33 of pump plunger 29 to the axial bore 44 of shaft 10 and from there radially outwardly through opening 48 of the shaft and passage 47 of the sprocket to the saw chain trained therearound.

Referring particularly to Fig. 4 wherein the pump mechanism is at the beginning of the suction stroke, upon clockwise rotation of the shaft 10 the surface indicated at 52, being of an extreme eccentricity, will govern the actuation of the pump. Therefore, as the shaft 10 rotates clockwise from the position shown in Fig. 4 to that shown in Fig. 5, surface 52, being in contact with the inner surface of ring 30, causes the plunger to raise and tip off to one side. This movement partially withdraws the pump plunger 29 in the bore 36 and simultaneously slightly rotates the member 35 counterclockwise to enlarge the portion of the mouth of opening 41 which is in communication with the cylinder cavity 32. Thus, with bushing 34 positioned as shown in Fig. 5, the oil line passageway formed at the mouths of bore 36 and opening 41 is open to its maximum permissible extent at approximately that phase of shaft rotation, while rotation to the position shown in Fig. 6 partially closes the oil line pasageway, and rotation to the position shown in Fig. 7 closes it off entirely. It should be understood that during rotation of shaft 10, bushing 34, with its opening 41, remains in a previously fixed position, while only member 35 is oscillated through a small angle with respect thereto.

As pump plunger 29 moves from the position shown in Fig. 4 to the position shown in Fig. 5 during the suction stroke, oil is caused to flow as indicated by the arrows shown in Fig. 5, since the pump plunger 29 is partially withdrawn through the bore 36. Oil is drawn into the cavity 32 in the amount of the volume previously displaced by the plunger, providing the inlet passage remains open. During this suction stroke, eccentric 31 seals the mouth 51 of the discharge passage 33 so that priming is unnecessary.

The pump is self priming since a comparatively large amount of oil is drawn into the cylinder during the suction stroke. Utilizing the entire displacement capacity of the pump results in positive and dependable priming action.

Rotation of shaft 10 to the position shown in Fig. 6 raises the pump plunger 29 to its upper limit which defines the length of the suction stroke. At this position it will be observed the discharge passage is closed but further rotation through a small angle causes the space formed by slot 50 to be brought adjacent the mouth 51 of plunger bore 33, breaking the seal and preparing the pump for the delivery stroke. When the seal is broken the vacuum which was created during the suction stroke is broken and the fluid is free to return through the inlet passage into the supply line 43.

Referring to Fig. 7, which shows the oil delivery stroke of the pump, it will be noted that the shaft has been rotated one-quarter of a turn in a clockwise direction from the position shown in Fig. 6. The mouth of the inlet passage is closed, while a through passage is provided to the axial bore 44 of shaft 10 through plunger bore 33, slot 50 and radial passage 49. Further rotation in a clockwise direction of shaft 10 causes the ring 30 to be driven downwardly by eccentric 31, thereby driving the plunger 29 downwardly within the bore 36. The displaced oil is forced in the direction of the arrows shown in Fig. 7 through bore 33 in plunger 29 into the space formed by the walls of slot 50 and from thence into the axial bore 44 of shaft 10. Thus the fluid is forced to the shaft opening 48 and through sprocket opening 47 is applied directly to the saw chain trained around sprocket 11.

An important feature of this invention lies in the provision of means to adjust the quantity of oil pumped out the discharge passage during a cycle of operation of the pump. The amount of oil which is admitted to the cylinder cavity through the inlet passage upon the suction stroke is unregulated under the preferred form of the invention illustrated. Accordingly, during the entire suction stroke the inlet passage remains open and the discharge passage remains closed. This is illustrated in Figs. 4, 5, and 6, Fig. 4 showing the commencement of the suction stroke, Fig. 5 illustrating the pump mechanism midway during the suction stroke, and Fig. 6 showing the end of the suction stroke.

The amount of oil pumped during the delivery stroke out the discharge passage is regulated by controlling the period of time during the delivery stroke that the inlet passage of the pump remains open. It is apparent that if the inlet passage remains open for a period after the commencement of the delivery stroke a portion of the charge contained within the cylinder cavity will be forced back through the inlet passage into the oil supply line. Further, that if this period may be adjusted, the amount of the charge forced out the discharge passage may be correspondingly adjusted. By so controlling the return flow to the inlet passage the oil is pumped out the discharge passage and from thence onto the chain in inverse proportion to the amount returned to the oil supply line.

One form of adjustment for the period of time during the delivery stroke that the inlet passage remains open is illustrated in the drawings. Other forms may be utilized but in this preferred form bushing 34 is mounted to be positioned in housing 17 by means of an arm 45 located exteriorly of the housing 17 and pivoted about the axis of rotation of bushing 34. Said arm 45 is mounted upon bushing shank 53 which protrudes to the exterior of housing 17. Arm 52 is adjustably restrained against the transmission housing by means of a screw 54. A pointer 55 is provided on the arm and a calibrated scale 56 is inscribed on the housing 17 adjacent the tip of the pointer.

Considering the adjustment mechanism it is noted that in the position of the bushing 34 which is shown in Figs. 4–7, a medium flow of oil is allowed. Thus the indicator-pointer 55 is aligned to position bushing 34 to where the inlet passage is closed earlier during the delivery stroke than it is with the indicator set on the "Min." marking. Likewise to obtain greater oil flow the bushing 34 must be positioned to where the inlet passage is closed during the delivery stroke earlier than it is with the indicator set for medium flow. Maximum flow would be obtained by positioning 34 to where the full charge drawn into the cylinder cavity on the suction stroke is expelled out the discharge passage. Maximum flow for a pump constructed in accordance with the drawings is obtained by positioning bushing 34 to where the inlet passage is closed the instant the mouth of discharge passage 33 is opened by slot 50 being rotated in communication therewith. Since the discharge passage is open for less than 180° of shaft rotation, the inlet passage, with bushing 34 so positioned, remains closed during the entire period the discharge passage remains open.

Conversely, minimum flow for a pump so constructed, is obtained by positioning bushing 34 to where the inlet passage remains open during substantially the entire delivery stroke.

Referring to the drawings, if bushing 34 is rotated counterclockwise from the position shown in Fig. 6, to the maximum limit of movement permitted by arcuate slot 57 in arm 47, the entire charge contained in the cylinder cavity is expelled out the discharge passage of the pump mechanism and none is returned to the oil reservoir. However, if bushing 34 is rotated clockwise from the position shown in Fig. 6 to the maximum limit of movement permitted by arcuate slot 57, the inlet passage remains open during a substantial portion of the delivery stroke and consequently a major portion of the charge contained in the cylinder cavity at the end of the suction stroke is forced back through the inlet passage during the delivery stroke and only a minor portion of the charge is expelled out the discharge passage.

Therefore, a simple yet exact method for setting the amount of oil expelled out the discharge passage of the pump is provided. The lever arm which is used for adjustment purposes is conveniently arranged on the outside of the housing. Since the bushing is not a moving part of the pump mechanism it may be adjusted during operation of the machine.

It will be observed that the problem of oil sealing is minimized by the construction illustrated as a preferred form of this invention. Fig. 3 reveals that the pump and cylinder assembly is bracketed on the shaft by bearings which function to seal the mechanism against oil leakage. The entire compact unit is ruggedly constructed and operation is dependable.

While the foregoing description discloses a specific embodiment of this invention numerous modifications may be effected and the specific construction and the mode of carrying out this invention may be varied without departing from the spirit thereof. Accordingly, the scope of this invention must be viewed in the light of the foregoing description and is limited only by the appended claims.

I claim:

1. A pump comprising a casing, a shaft journalled in the casing for rotation about its axis, an eccentric portion on said shaft, a cylinder element journalled in said casing for rotation about an axis spaced from and parallel to said axis of said shaft, said cylinder element provided with a transverse cylindrical bore axially aligned with said eccentric portion of said shaft, a piston element drivingly connected to said eccentric portion of said shaft and slidably received in said bore of said cylinder element, said piston element, eccentric portion, and cylinder element so constructed and arranged that the piston element is simultaneously reciprocated in said transverse bore and pivotally actuated about the axis of the journalled cylinder element by the action of the eccentric portion, an inlet passage intersecting said transverse bore of the cylinder element at one extreme position of its oscillatory movement, an outlet passage communicating with said transverse bore, a cylindrical sleeve surrounding said cylinder element and mounted for rotation in said casing, said sleeve having a first aperture to accommodate movement of the piston element and a second aperture cooperating with the inlet passage and said transverse bore to infinitely vary the pumping rate at any given pump speed by varying the point in the oscillation movement of the cylinder element at which the inlet passage intersects the said bore as the sleeve is rotatably positioned in the casing, and means for selectively positioning the sleeve to thus vary the pumping rate.

2. A pump comprising a casing, a shaft with an eccentric section mounted for rotation in said casing, a piston and cylinder assembly mounted in said casing and actuated by said eccentric section to produce relative reciprocation between the piston and cylinder as well as oscillating pivotal motion of both the piston and cylinder with respect to the casing, said cylinder provided with an open end which is closed by a cooperating portion of the casing during a portion of its pivotal movement and connected to an inlet passage during another portion of the pivotal movement, an outlet passage communicating with said cylinder interior, and adjustable control means in the casing cooperating with said inlet passage and said open end of the cylinder to selectively and infinitely vary the pumping rate of the pump at any given pump speed.

3. In a chain saw comprising a casing, a saw chain, a guide bar with a groove for supporting the chain, power drive means in driving engagement with said chain, a lubricating oil pump mounted in the casing and driven by the chain power drive means, and passageways for conveying lubricating oil from the pump to the chain; adjustable control means mounted in the casing for varying infinitely and selectively the output of the pump independently of the speed of the chain power drive means, and manually actuable means for adjusting the control means.

References Cited in the file of this patent

UNITED STATES PATENTS

| | | |
|---|---|---|
| 807,731 | Dodge | Dec. 19, 1905 |
| 833,678 | Delaunay | Oct. 16, 1906 |
| 1,262,979 | Putnam | Apr. 16, 1918 |
| 1,861,937 | Philips | June 7, 1932 |
| 2,409,775 | Mall | Oct. 22, 1946 |
| 2,741,276 | Warren | Apr. 10, 1956 |

FOREIGN PATENTS

| | | |
|---|---|---|
| 2,200 | Great Britain | 1908 |
| 562,547 | Germany | Oct. 26, 1932 |
| 700,495 | France | Dec. 23, 1930 |